June 11, 1940.  J. W. MacCLATCHIE  2,204,142
GATE VALVE
Filed Dec. 13, 1937  4 Sheets-Sheet 1

John W. MacClatchie
INVENTOR
BY Robert M. McManigal
ATTORNEY

June 11, 1940.  J. W. MacCLATCHIE  2,204,142
GATE VALVE
Filed Dec. 13, 1937  4 Sheets-Sheet 2

John W. MacClatchie
INVENTOR

BY Robert M. McManigal
ATTORNEY

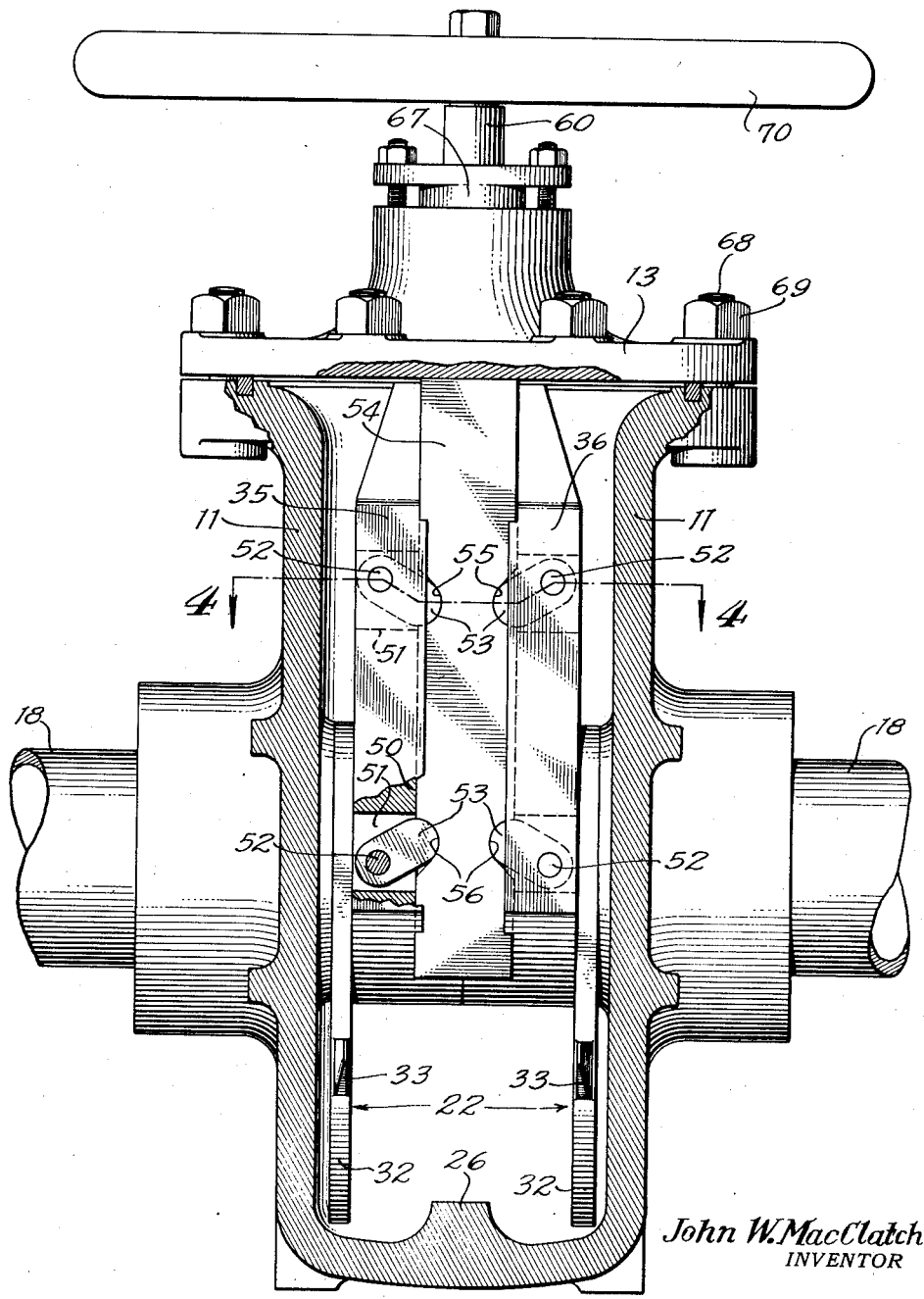

June 11, 1940.  J. W. MacCLATCHIE  2,204,142
GATE VALVE
Filed Dec. 13, 1937  4 Sheets-Sheet 4
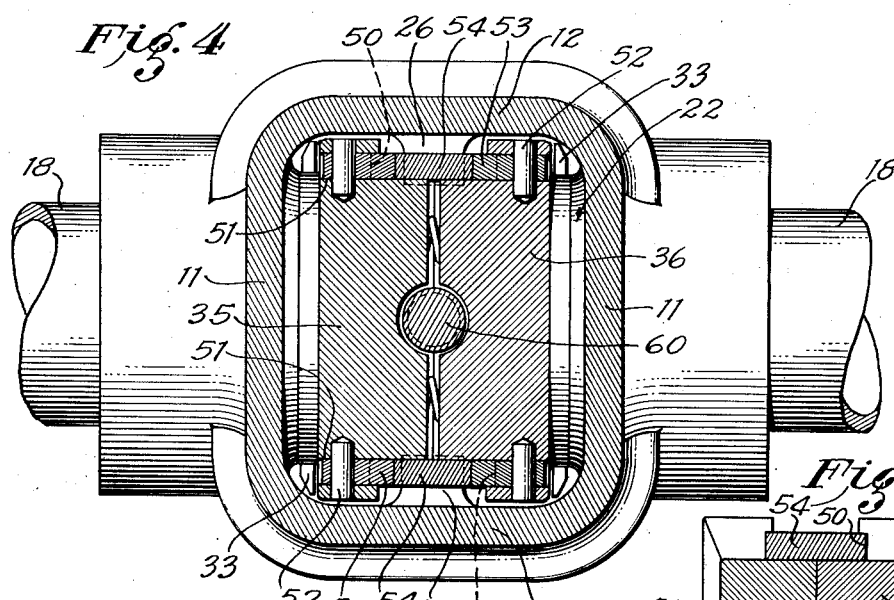
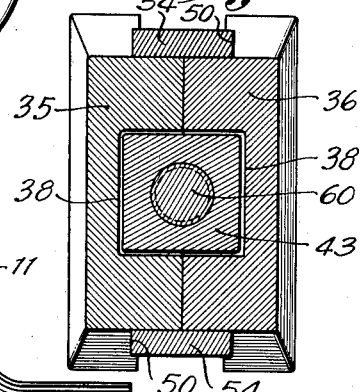
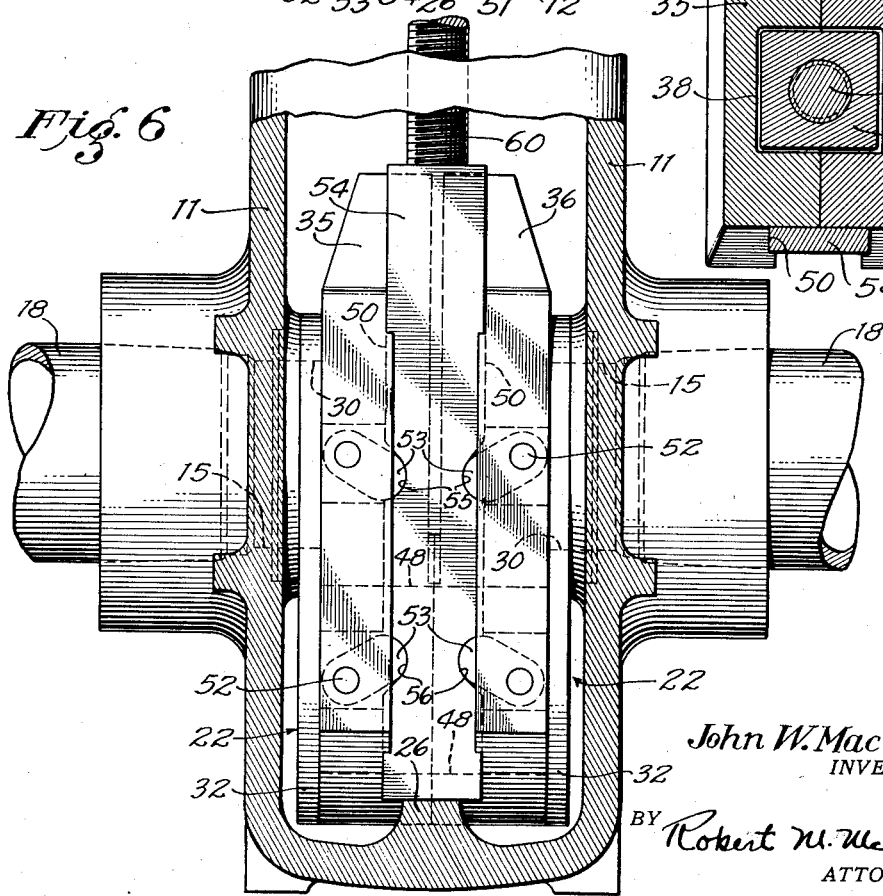
John W. MacClatchie
INVENTOR
BY Robert M. McManigal
ATTORNEY Patented June 11, 1940

2,204,142

UNITED STATES PATENT OFFICE 2,204,142

GATE VALVE

John W. MacClatchie, Los Angeles, Calif., assignor to MacClatchie Manufacturing Company of California, Compton, Calif., a corporation of California Application December 13, 1937, Serial No. 179,498

9 Claims. (Cl. 251—67)

This invention relates to gate valves, and particularly to gate valves which are adapted for use under high working pressures.

An object of my invention is to provide a gate valve which offers unrestricted passage to the flow of fluid, which passage is exactly the same diameter and cross-section as that of the inside diameter of the pipe in which the valve is adapted to be inserted, and which is packed off in such manner as to prevent the fluid in the pipe from mixing with the lubricant in the gate valve, even though the fluid in the pipe line is being pumped under high working pressure.

Another object of my invention is to provide a gate valve in which the fluid is conducted through the valve without creating any eddy or whirling currents in the fluid and which has no recesses or corners in which sediment or other deposits may collect, start corrosion, or interfere with the operation of the valve.

Another object of my invention is to provide a gate valve in which no moving parts of the valve mechanism are exposed to the atmosphere or to the fluid passing through the valve.

Another object of my invention is to provide a gate valve which is adapted to be used under high working pressures in which toggle means are provided to force the valve mechanism against the ports to insure a positive seal when said gate valve is in either operative or inoperative position.

Another object of my invention is to provide a gate valve which is simple to manufacture and operate and the parts of which are conveniently accessible for inspection, repair, or replacement.

Another object of my invention is to provide a gate valve in which all of the moving parts are immersed in a lubricant to insure ease of operation and positive action.

Figure 3 is a partial vertical section taken along the line 3—3 of Figure 2.

Figure 4 is a horizontal section taken along the line 4—4 of Figure 3.

Figure 5 is a partial section taken along the line 5—5 of Figure 1.

Figure 6 is a partial section similar to the section shown in Figure 3 but with the valve mechanism in the closed position.

Figure 1:
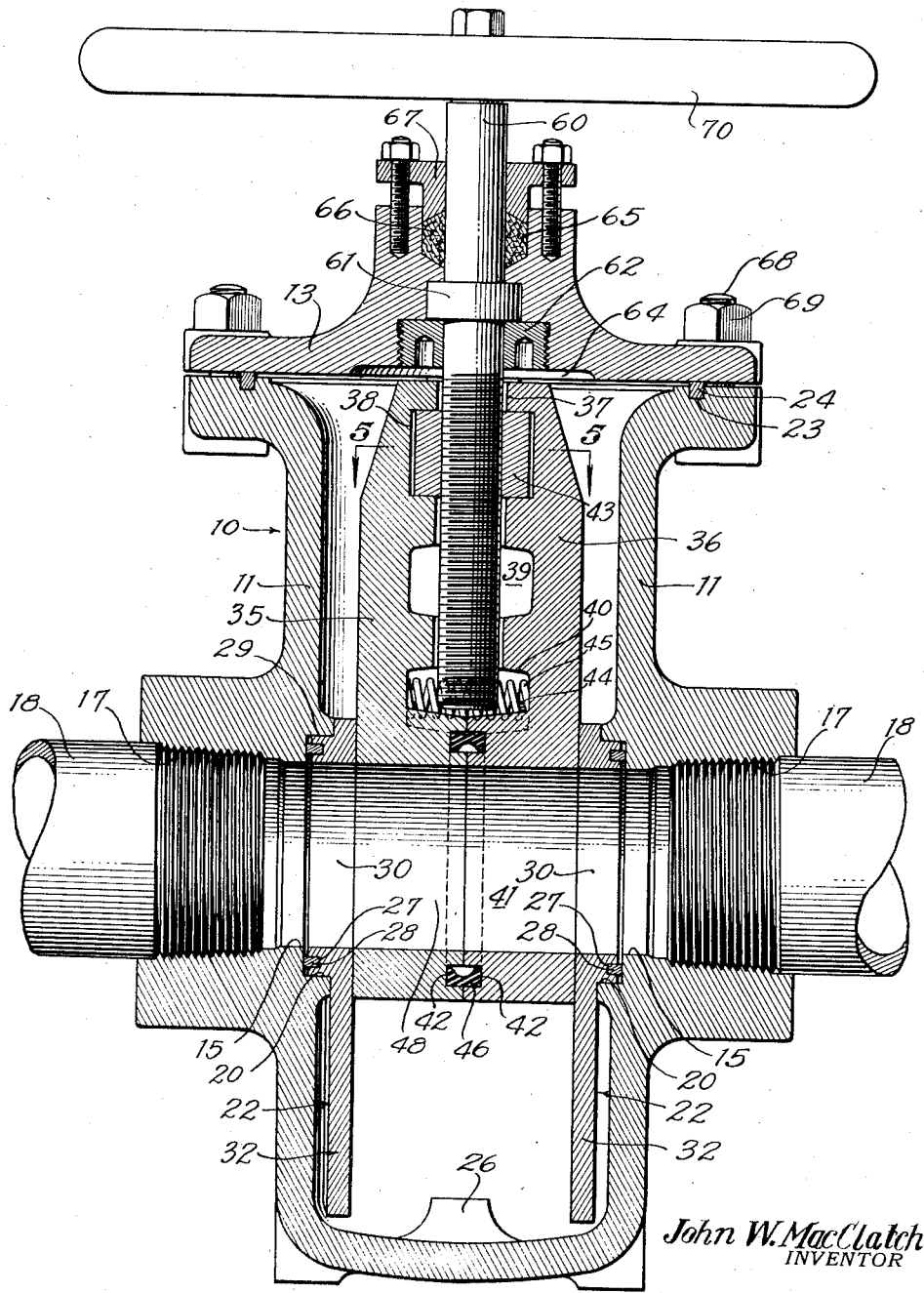
Figure 1 is a vertical section of the valve taken on axis longitudinally with the pipe.

The numeral 10 indicates a rectangular shaped prismatic housing having sides 11 and 12, and which is closed at the bottom and open at the top. The top is adapted to be closed by a cover plate 13. Ports 15 are provided on the opposite sides of the housing 10 and the ports are threaded as indicated at 17 to connect the pipes 18. The inside of the housing 10 adjacent to the ports 15 is provided with annular recesses 20 in order to receive portions of face plates 22.

An annular recess 23 is provided in the top portion of the housing 10 in which flexible sealing packing 24 is adapted to be inserted to effect a positive seal between the housing and the cover plate 13 when the valve is assembled. Lugs 26 are provided in the bottom of the housing adjacent to the sides 12 and equidistant from sides 11.

The sides of the face plates 22 adjacent the ports 15 are provided with annular recesses 27 in which resilient sealing packing 28 is inserted to provide a positive seal between said ports and said face plates when said face plates are in position.

The face plates 22 are provided with annular shoulders 29 which are adapted to closely engage the sides of annular recesses 20 when said face plates are pressed into position. The portions of the face plates and housing which are adapted to abut are machined to a smooth surface. The face plates 22 are also provided with annular passageways 30 which are of the same diameter as the inside diameter of the pipes 18 and are concentric with ports 15 when said face plates are pressed into position. The face plates 22 are also provided with depending guide portions 32 which extend almost to the bottom of the housing and which are parallel to each other. Lugs 33 are provided on both sides of the guide portions 32 which prevent the plates from turning.

The valve mechanism consists in part of gate members 35 and 36, the center adjacent portions of which are provided with a vertical annular recess 37, rectangular recesses 38, 39, and 40, cylindrical opening 41 and annular recess 42. The abutting surfaces of the gate members 35 and 36, and the faces of the face plates 22 and the faces of the gate members 35 and 36 which are adapted to abut said faces of said face plates 22 are machined to a smooth surface. A rectangular nut 43 is mounted between the gates 35 and 36 in the rectangular recess 38, which nut closely engages the sides of said recess. The recess 39 is provided to eliminate excessive weight. Lugs 44 are provided in the recess 40, over which springs 45 are adapted to be mounted in order to urge the gate members 35 and 36 apart and against the face plates 22 at all times when said gates are in position in the housing 10. A pressure sealing packing ring 46 is adapted to be inserted in the annular recess 42 in order to effect a positive fluid tight seal between the gate members at all times. The longitudinal cylindrical opening 41 forms a passageway 48. The passageway 48, the passageways 30 through the face plates 22, the ports 15 and the inside diameter of the pipes 18 are preferably all of the same diameter.

Means are also provided to force the faces of the gate members 35 and 36 against the face plates 22 into sealing engagement with said face plates when said gate members have been moved to either operative or inoperative position.

As an instance of this arrangement, and as shown in Figures 3, 4 and 6, recesses 50 are provided in both sides of the gate members 35 and 36 near the sides 12 of the housing 10, and slots 51 are provided in said recesses. Pivotably mounted in said slots 51 by means of pins 52 are pawls 53. Pawl plates 54 are mounted in the recesses 50, between the pawls 53. The ends of the upper sets of pawls 53 are adapted to be inserted in upper recesses 55 of the pawl plates 54, and the ends of the lower sets of pawls 53, are adapted to be inserted in the lower recesses 56 of said pawl plates 54.

Means are provided to move the gate members 35 and 36 lengthwise in the housing 10 in order to bring the valve mechanism into operative (closed) or inoperative (open) position, i. e. into and out of alignment with the ports 15.

As an instance of this arrangement, a valve stem 60 is provided which is adapted to move the gate members 35 and 36 up or down in the housing, depending upon the direction of the rotation of said valve stem.

The valve stem 60 is provided with a collar 61, which is inserted in the cover plate 13, and is adapted to be held in place in said cover plate 13 by means of a stem retaining nut 62 which is adapted to be threaded into the cover plate after the valve stem 60 is inserted in the cover plate. The valve stem 60 is also threaded through the gate nut 43 which imparts lengthwise movement to the gate members 35 and 36 in the housing 10, upon rotation of the valve stem 60, since the cover plate 13 and the retaining nut 62 prevent the valve stem 60 from vertical movement.

The cover plate 13 is provided with annular recesses 64 and 65, packing 66 and a packing gland 67. The annular packing 24 is inserted in the recess 23 and the cover plate 13 is tightly secured to the housing 10 by means of bolts 68 and nuts 69. A wheel 70 is then connected to the upper end of the valve stem 60.

The depending portions 32 of the face plates 22 act as guide plates as the valve mechanism is moved from one position to another and also prevent any lateral movement of the gate members 35 and 36 other than the lateral movement due to the action of the pawls which action will be explained hereinafter. The face plates also effect a positive seal between said plates and the gate members 35 and 36 and thereby prevent any of the fluid in the passageway 48 from entering any other part of the housing 10.

The housing 10 is filled with a lubricant in order to insure ease of operation and to prevent the valve mechanism from becoming stuck.

I prefer to use two different metals in the construction of the gate members 35 and 36 and the face plates 22 in order to reduce the friction.

It will be seen that the valve mechanism can be readily assembled or disassembled so that it can be easily inspected and any worn parts repaired or renewed.

The operation of the valve mechanism is as follows:

In closing the valve mechanism, the wheel 70 is rotated counterclockwise which moves the gate members 35 and 36 and the pawls 53 which are pivoted on said members down into the housing. The pawls 53 move the pawl plates 54 down with them. The pawl plates 54 are adapted to come in contact with the lugs 26 shortly before the valve mechanism is in operative (closed) position and as the pawl plates 54 come into contact with said lugs 26, the continued downward movement of the gate members 35 and 36 causes the upper sets of pawls 53 to engage the sides of upper recesses 55 of pawl plates 54 and exert an outward lateral force on the pins 52 and thereby on the gate members 35 and 36.

This lateral force on the gate members 35 and 36 forces the faces of said gate members into positive sealing position with the face plates 22 adjacent the ports 15. In this position the lower sets of pawls 53 are idle.

When the valve mechanism is in this position, as shown in Figure 6, the valve is in operative or closed position, with the faces of the gate members 35 and 36 closed across the ports 15.

In opening the valve mechanism, the wheel 70 is rotated clockwise which moves the gate members 35 and 36 toward the top of the housing. The pawl plates 54 are adapted to come into contact with the lower part of cover plate 13 shortly before the valve mechanism is in inoperative (open) position. The upper parts of the gate members 35 and 36 are adapted to enter the recess 64 of the cover plate 13. When the pawl plates 54 come into contact with said surface, the lower sets of pawls 53 engage the sides of the lower recesses 56 of the pawl plate 54 and further upward movement of the valve mechanism forces the lower sets of pawls 53 to exert an outward lateral force on the gate members 35 and 36 through the pins 52.

This lateral force on the gate members 35 and 36 forces the faces of said members into positive sealing position with the face plates 22 adjacent the ports 15. In this position the upper sets of pawls 53 are idle.

Figure 2:
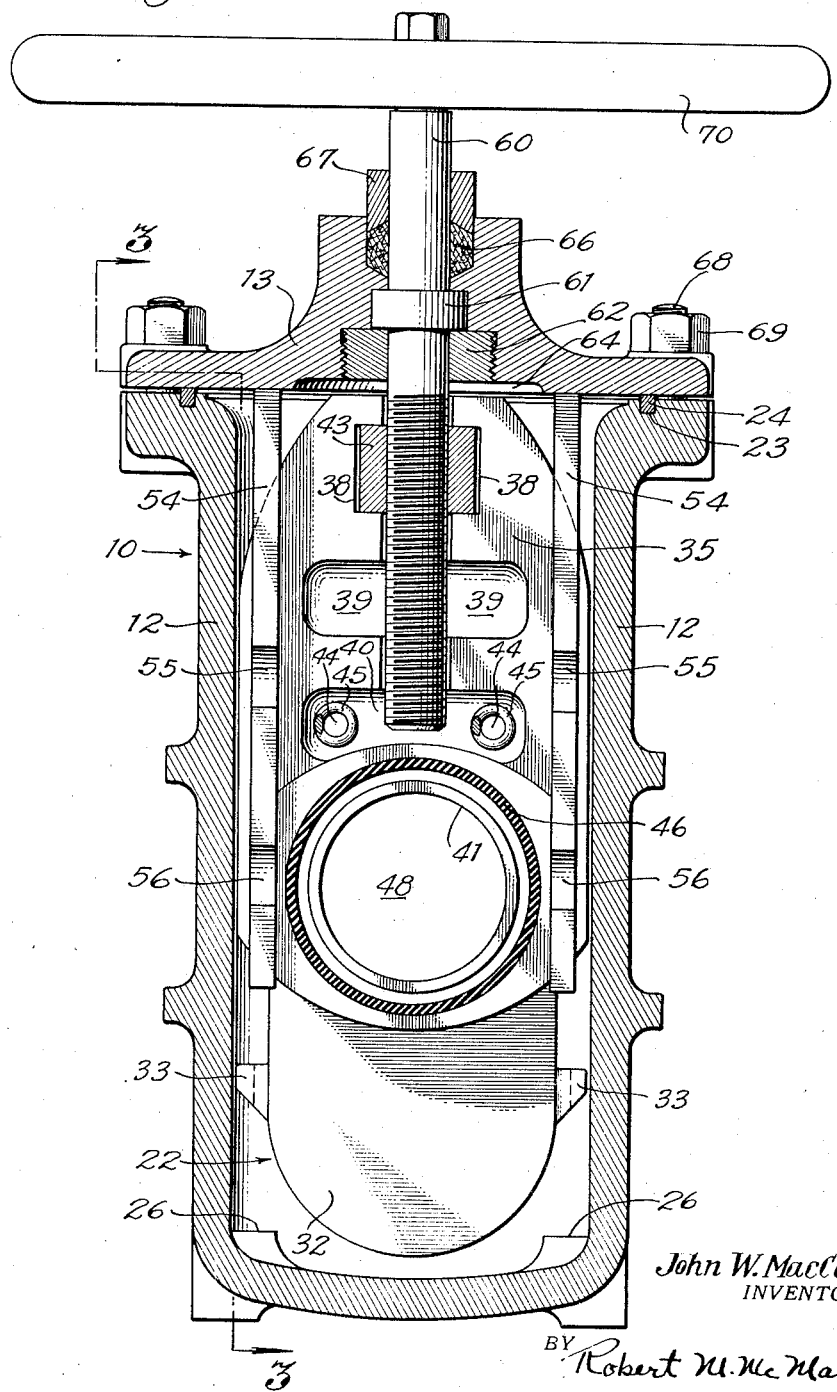
Figure 2 is a vertical section taken on axis cross-wise the pipe line.

When the valve mechanism is in this position, as shown in Figures 1, 2 and 3, the valve is in inoperative or open position, and the opening in the pipes 18, the ports 15, the passageway 30 through the face plates 22, and the passageway 48 through the gate members 35 and 36 are all in alignment.

The extreme lengthwise movement of the valve mechanism is restricted only by the action of the pawl plates 54, and the pawls 53 on the gate members 35 and 36. Between the extreme positions the pawls 53 are idle, other than to carry the pawl plates 54. The faces of the gate members 35 and 36 are held against the face plates 22 by the action of the springs 45 which are located on either side of the valve stem 60 and above the passageway 48.

Although I have shown a right hand thread on the valve stem 60, said valve stem may be provided with a left hand thread in which event the wheel 70 would be rotated in a clockwise direction to close the valve and in a counterclockwise direction to open the valve.

In a modification of my invention, (not shown), instead of providing face plates 22 with depending guides, the inside of the ports 15 are made flush with the lower adjacent surfaces, and all surfaces of the sides 11 of said housing which are adapted to be in contact with the faces of the gate members 35 and 36 are machined to be smooth flush finish, and all remaining surfaces of said sides 11 are somewhat recessed.

From the foregoing description taken in connection with the accompanying drawings, advantages of the construction and method of operation will be readily understood by those skilled in the art to which the invention appertains, and while I have described the principle of operation, together with the forms which I now consider to be the best embodiment thereof, I desire to have it understood that the articles shown are merely illustrative and that the invention is not to be limited to the details disclosed therein but is to be accorded the full scope of the appended claims.

I claim:

1. In a valve of the class described, the combination of a housing having ports adapted for the connection of sections of pipe into said housing, face plates having ports and depending guide portions adapted to be inserted in said housing adjacent said ports of said housing, packing between said housing and said face plates, a split valve mechanism comprising two gate members having an unobstructed passageway therethrough movable into operative position to close said ports and into inoperative position to connect said ports, the passageway through said pipe, ports, face plates and gate members being in line when said valve mechanism is in inoperative position and of substantially the same diameter and cross-section, said gate members having parallel faces for sealing engagement with the faces of said face plates and depending guide portions, packing between said gate members, means mounted on both sides of said passageway between said gate members for forcing said gate members outward into sealing engagement with said face plates when said valve mechanism is in either operative or inoperative position, and means for moving said valve mechanism into either operative or inoperative position.

2. In a valve of the class described, the combination of a housing having ports adapted for the connection of sections of pipe into said housing, face plates having ports and depending guide portions adapted to be inserted in said housing adjacent said ports of said housing, a split valve mechanism comprising two gate members having an unobstructed passageway therethrough movable into operative position to close said ports and into inoperative position to connect said ports, the passageway through said pipe, ports, face plates, and gate members being in line when said valve mechanism is in inoperative position and of substantially the same diameter and cross-section, said gate members having parallel faces for sealing engagement with the faces of said face plates and depending guide portions, toggle means mounted on both sides of said passageway between said gate members for forcing said gate members laterally outward into sealing engagement with said face plates when said valve mechanism is in either operative or inoperative position, and means for moving said valve mechanism into either operative or inoperative position.

3. In a valve of the class described, the combination of a housing having ports adapted for the connection of sections of pipe into said housing, a split valve mechanism comprising two gate members having an unobstructed passageway therethrough movable into operative position to close said ports and into inoperative position to connect said ports, the passageway through said pipe, ports, and gate members being in line when said valve mechanism is in inoperative position and of substantially the same diameter and cross-section, said gate members having parallel faces for sealing engagement with said ports and with the surface of the housing which is adapted to be engaged by said faces of said gate members, packing between said gate members, toggle means mounted on both sides of said passageway between said gate members for forcing said gate members laterally outward into sealing engagement with said housing when said valve mechanism is in either operative or inoperative position, and means for moving said valve mechanism into either operative or inoperative position.

4. In a valve of the class described, the combination of a housing having ports adapted for the connection of sections of pipe into said housing, the sides of said housing having said ports being provided with seating surfaces, a split valve mechanism comprising two gate members having an unobstructed passageway therethrough movable into operative position to close said ports and into inoperative position to connect said ports, the passageway through said pipe, ports, and gate members being in line when said valve mechanism is in inoperative position and of substantially the same diameter and cross-section, said gate members having parallel faces for sealing engagement with said sides of said housing, each of said gate members also having a recess on both sides of said passageway, toggle means pivotably mounted in each of said recesses between said gate members for forcing said gate members laterally outward into sealing engagement with said sides of said housing when said valve mechanism is in either operative or inoperative position, and means for moving said valve mechanism into either operative or inoperative position.

5. In a valve of the class described, the combination of a housing having ports adapted for the connection of sections of pipe into said housing, face plates having ports and depending guide portions adapted to be inserted in said housing adjacent said ports of said housing, packing between said housing and said face plates, a split valve mechanism comprising two gate members having an unobstructed passageway therethrough movable into operative position to close said ports and into inoperative position to connect said ports, the passageway through said pipe, ports, face plates and gate members being in line when said valve mechanism is in inoperative position and of substantially the same diameter and cross-section, said gate members having parallel faces for sealing engagement with the faces of said face plates and depending guide portions, each of said gate members also having a recess on both sides of said passageway, packing between said gate members, pawls pivotably mounted in each of said recesses on each of said gate members, the other ends of said pawls being adapted to be inserted in recesses in pawl plates mounted between said pawls, means for limiting the lengthwise movement of said pawl plates prior to limiting the lengthwise movement of said gate members for forcing the gate members laterally outward into sealing engagement with said face plates upon continued movement of said valve members after limitation of movement of said pawl plates, and means for moving said valve mechanism into either operative or inoperative position.

6. In a valve of the class described, the combination of a housing having ports adapted for the connection of sections of pipe into said housing, face plates having ports and depending guide portions adapted to be inserted in said housing adjacent said ports of said housing, packing between said housing and said face plates, a split valve mechanism comprising two gate members having an unobstructed passageway therethrough movable into operative position to close said ports and into inoperative position to connect said ports, the passageway through said pipe, ports, face plates and gate members being in line when said valve mechanism is in inoperative position and of substantially the same diameter and cross-section, said gate members having parallel faces for sealing engagement with the faces of said face plates and depending guide portions, packing between said gate members, upper and lower sets of pawls pivotably mounted on each side of the passageway on said gate members, pawl plates mounted between said pawls, means for limiting the movement of said pawl plates prior to limiting the movement of said gate members, the upper sets of pawls being operative upon continued movement of the gate members after limitation of movement of the pawl plates for forcing said gate members laterally outward into close engagement with said face plates when said valve mechanism is moved to operative position and the lower sets of pawls being operative upon continued movement of the gate members after limitation of movement of the pawl plates for forcing said gate members laterally outward into close engagement with said face plates when said valve mechanism is moved to inoperative position, and means for moving said valve mechanism into either operative or inoperative position.

7. In a valve of the class described, the combination of a housing having ports adapted for the connection of sections of pipe into said housing, a split valve mechanism comprising two gate members having an unobstructed passageway therethrough movable into operative position to close said ports and into inoperative position to connect said ports, the passageway through said pipe, ports, and gate members being in line when said valve mechanism is in inoperative position and of substantially the same diameter and cross-section, said gate members having parallel faces for sealing engagement with the surface of the housing which is adapted to be engaged by said faces of said gate members, packing between said gate members, pawls pivotably mounted on both sides of said passageway on each of said gate members, the other ends of said pawls being adapted to be inserted in recesses in pawl plates mounted between said pawls, means for limiting the lengthwise movement of said pawl plates prior to limiting the lengthwise movement of said gate members for forcing the gate members laterally outward into sealing engagement with said ports upon continued movement of said gate members after limitation of movement of said pawl plates, and means for moving said valve mechanism into either operative or inoperative position.

8. In a valve of the class described, the combination of a housing having ports adapted for the connection of sections of pipe into said housing, a split valve mechanism comprising two gate members having an unobstructed passageway therethrough movable into operative position to close said ports and into inoperative position to connect said ports, the passageway through said pipe, ports, and gate members being in line when said valve mechanism is in inoperative position and of substantially the same diameter and cross-section, said gate members having parallel faces for sealing engagement with the surface of the housing which is adapted to be engaged by said faces of said gate members, packing between said gate members, upper and lower sets of pawls pivotably mounted on each side of said passageway on said gate members, pawl plates mounted between said pawls, means for limiting the movement of said pawl plates prior to limiting the movement of said gate members, the upper sets of pawls being operative upon continued movement of the gate members after limitation of movement of the pawl plates for forcing said gate members laterally outward into close engagement with said ports when said valve mechanism is moved to operative position and the lower sets of pawls being operative upon continued movement of the gate members after limitation of movement of the pawl plates for forcing said gate members laterally outward into close engagement with said ports when said valve mechanism is moved to inoperative position, and means for moving said valve mechanism into either operative or inoperative position.

9. In a valve of the class described, the combination of a housing having ports adapted for the connection of sections of pipe into said housing, face plates having ports and depending guide portions adapted to be inserted in said housing adjacent said ports of said housing, packing between said housing and said face plates, a split valve mechanism comprising two gate members having an unobstructed passageway therethrough movable into operative position to close said ports and into inoperative position to connect said ports, the passageway through said pipe, ports, face plates and gate members being in line when said valve mechanism is in inoperative position and of substantially the same diameter and cross-section, said gate members having parallel faces for sealing engagement with the faces of said face plates and depending guide portions, each of said gate members also having a recess on both sides of said passageway, packing between said gate members, means pivotably mounted between said gate members in each of said recesses for forcing said gate members outward into sealing engagement with said face plates when said valve mechanism is in either operative or inoperative position, and means for moving said valve mechanism into either operative or inoperative position.

JOHN W. MacCLATCHIE.